J. L. CLARKE.
ELECTRICAL MEASURING APPARATUS.
APPLICATION FILED FEB. 10, 1920.

1,381,968.

Patented June 21, 1921.

Inventor
J. L. Clarke
By C. J. Fetherstonhaugh
Attorney

UNITED STATES PATENT OFFICE.

JOHN L. CLARKE, OF MONTREAL, QUEBEC, CANADA.

ELECTRICAL MEASURING APPARATUS.

1,381,968.   Specification of Letters Patent.   Patented June 21, 1921.

Application filed February 10, 1920. Serial No. 357,717.

*To all whom it may concern:*

Be it known that I, JOHN LEONARD CLARKE, a subject of the King of Great Britain, and residing at 366 Hingston avenue, in the city and District of Montreal, in the Province of Quebec, in the Dominion of Canada, have invented a new and useful Electrical Measuring Apparatus, of which the following is the specification.

The invention relates to an electrical measuring apparatus as described in the present specification and illustrated in the accompanying drawings that form part of the same.

The invention consists essentially of an apparatus in which a series impedance is contained in one branch of an electrical circuit, while there is a gap in the other branch of the same circuit for the introduction of the line or part to be tested.

The objects of the invention are to determine the transmission losses occurring in transmission lines, especially where the flow of electrical current is very light, as in telephone, telegraph, signal and electrical distant indicator circuits, "such transmission losses" meaning the changes in the magnitude of the current and in the phase of the current as it passes from one point in the circuit to another; to furnish an apparatus that will measure the transmission losses at any frequency, such as will be found in the speech current in a telephone circuit, which is a complex wave built up of a number of waves having varying frequencies; and generally to provide a means for determining the losses or defect in lines or parts making up telephone or other systems.

In the drawings, Figure 1 is a diagrammatic view, showing the wiring in a preferred form of the measuring apparatus.

Like characters of reference indicate corresponding parts in each figure.

The determination of the transmission loss due to the insertion of any piece of apparatus, or circuit, in an electrical circuit, is equivalent to determining the vector ratio of the current existing in the circuit after the apparatus is inserted in the circuit to the current existing in the circuit before the apparatus was inserted. It is assumed that the electromotive force producing the current is not affected by the change in the circuit produced by the insertion of the apparatus.

If $I_1$ be taken as a vector quantity expressing the current in the circuit before the apparatus is inserted and $I_2$ be taken as a vector quantity expressing the current in the circuit after the apparatus is inserted, then the ratio $\frac{I_2}{I_1}$ represents the transmission loss in the above mentioned circuit due to the insertion of the apparatus.

This ratio may be expressed as $K \angle \theta$ where $K$ is a scalar quantity equal to the ratio of the magnitudes of $I_2$ and $I_1$ and $\angle \theta$ is the difference between the phase angle of $I_2$ and the phase angle of $I_1$. The value of $K$ may be transformed into miles of standard cable by means of the equation $$K = (1 - e^{-La})$$

where $L$ is a figure expressing miles of standard cable and $a$ is an exponent depending on the frequency and the constants of the standard cable or by means of curves graphically delineating the relations expressed by the above equation.

Figure 1:
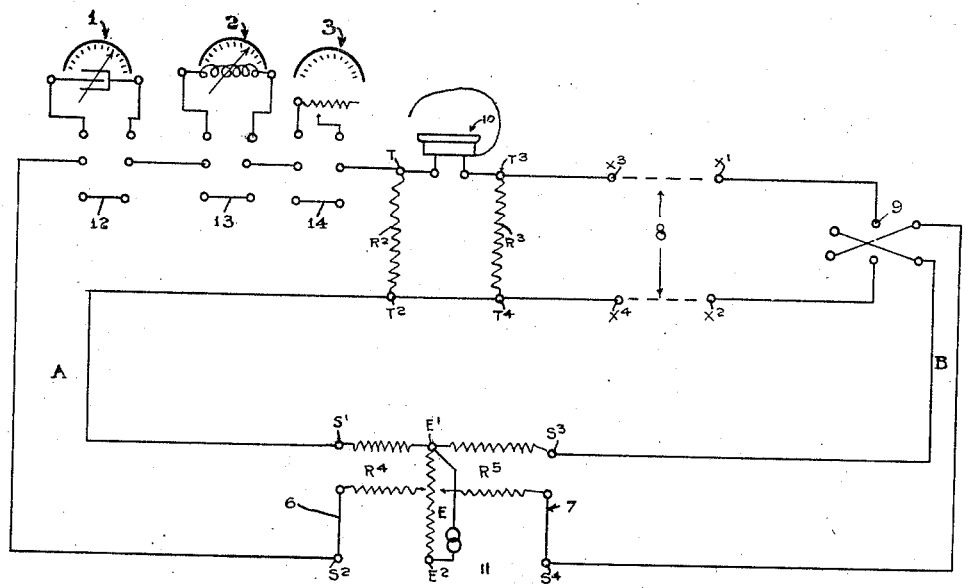
Figure 2:
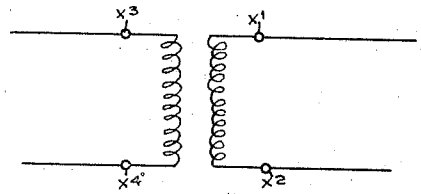
Fig. 2 is a diagrammatic view showing a repeating coil inserted in the gap.
Figure 3:
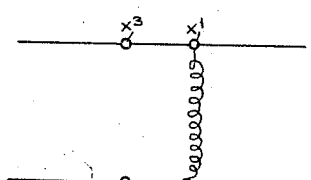
Fig. 3 is a diagrammatic view showing a retardation coil inserted in the gap.

The measurement of this vector ratio $K \angle \theta$ is accomplished by means of the apparatus described below. This apparatus will be more fully understood by reference to Fig. 1 where a detailed diagram of the circuit connections of one form of testing set is shown. This diagram shows a circuit having two branches A and B each terminating in an impedance, the impedances are designated $R_2$ and $R_3$. Branch A contains a variable series impedance designated by the Figs. 1, 2 and 3 in the diagram. 1 is variable capacity, 2 is a variable inductance, 3 is a variable resistance. 10 is a receiver or other means for detecting a potential difference between the points $T_1$ and $T_3$. 8 represents a break in circuit B terminated by the four terminals $X_1$, $X_2$, $X_3$ and $X_4$. Between these four terminals the apparatus of which the transmission loss is to be measured is connected. 9 is a reversing switch to be used when the angle of the series impedance in the A branch must be over 90° in order to give a balance in the receiver.

The networks 6 and 7 are so constructed that the impedance across $S_1$, $S_2$ looking toward E, and the impedance across $S_3$, $S_4$ looking toward E, are each made equal to the characteristic impedance of the circuit in which the apparatus whose loss is to be measured is to be used. 11 is a generator of A. C. current of the frequency at which it is desired to measure the loss in the apparatus.

12, 13 and 14, are double pole double throw switches for connecting in or removing out of the circuit A, the impedances 1, 2 and 3.

The testing set is operated as follows:—

The apparatus whose loss is to be measured is connected to the terminals $X_1$, $X_2$, $X_3$, $X_4$. If the apparatus is a repeating coil the primary terminals of the coil are connected to $X_1$ and $X_2$ and the secondary terminals to $X_3$ and $X_4$ as in Fig. 2. If the apparatus is similar to a retardation coil which is normally bridged across the circuit, the terminals of the coil are connected to $X_1$ and $X_2$ and $X_1$ is connected to $X_3$ and $X_2$ is connected to $X_4$ as in Fig. 3. Any apparatus is connected to the circuit B in the manner in which it would be normally connected to the circuit in which it is to operate.

The impedances $R_2$, $R_3$, $R_4$ and $R_5$ are adjusted so as to be each equal to the characteristic impedance of the circuit in which the loss in the apparatus is to be measured. The source of A. C. current is connected to the terminals marked $E_1$ and $E_2$, and adjustments are made in the impedances 1, 2 and 3 and if necessary reversing the switch 9 until no sound is heard in the receiver 10 or until the device for indicating potential difference between $T_1$ and $T_3$, indicates zero potential. Then if no potential exists between $T_1$ and $T_3$, no current is flowing from $T_1$ and $T_3$ and since $T_2$ and $T_4$ are at the same potential, this indicates that the potential between $T_1$ and $T_2$ is equal to the potential between $T_3$ and $T_4$ and since the impedance $R_2$ is equal to the impedance $R_3$, it follows that the current in $R_2$ is equal in magnitude to and is in phase with the current in $R_3$. Now the current in branch A will be $$\frac{E}{R_2+R_4+Z}$$

where Z is the total impedance due to the impedances 1, 2 and 3, hence the current in branch B is equal also to $$\frac{E}{R_2+R_4+Z}$$

since $R_3$ is in series with the circuit B and the currents in $R_2$ and $R_3$ are equal in magnitude and phase.

Now when $X_1$ is connected to $X_3$ and $X_2$ is connected to $X_4$ and when the switches 12, 13 and 14 are thrown downward to cut out the impedances 1, 2 and 3, then the impedance in the circuit A is $R_2+R_4$, and the impedance in the circuit B is $R_3+R_5$, but these impedances are all equal, hence the current in branch A is equal to the current in branch B and each will be equal to $$\frac{E}{R_2+R_4}.$$

Hence the ratio of the current after inserting the apparatus in the circuit B to the current before inserting the apparatus in circuit B will be equal to $$\frac{E}{R_2+R_4+Z}$$

divided by $$\frac{E}{R_2+R_4}=\frac{R_2+R_4}{R_2+R_4+Z}$$

this then is equal to the transmission loss due to inserting the apparatus in a circuit having a characteristic impedance equal to $R_2$. This factor is equal to $$\frac{I_2}{I_1}=K\angle\theta,$$

when the switch 9 has been reversed then $\angle\theta$ is changed by 180°.

Figure 4:
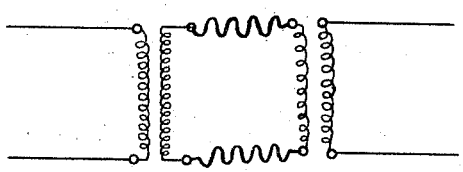
Fig. 4 is a diagrammatic view showing a transmission line in the gap.

When measuring the losses in circuits it is desirable to isolate the line or circuits by unit ratio repeating coils, a test being made first to determine the loss in the coils, this factor being allowed for in the following manner. Let $\frac{I_3}{I_1}$ be the loss measured of the circuit with the repeating coils in series with the circuit and $\frac{I_4}{I_1}$ be the loss measured of the repeating coils in series without the circuit, then the loss in the circuit $\frac{I_2}{I_1}$ will be $\frac{I_3}{I_1}$ divided by $\frac{I_4}{I_1}$. See Fig. 4.

In measuring the loss in inequality ratio repeating coils which are normally used to connect together circuits of different impedances, each side of the coil is connected to suitable impedances, that is $R_3$ and $R_5$ will be different impedances but $R_2$ will be equal to $R_3$ and $R_4$ will be equal to $R_5$. Owing to the method of balancing the currents in the two branches of the bridge, it is possible to obtain measurements of the transmission loss in pieces of apparatus with an accuracy of .001 of a mile of standard cable. For obtaining very accurate measurement it is necessary that the impedances $R_2$ and $R_3$ must be very closely adjusted to have the same impedance, it is also necessary that $R_4$ be equal to $R_5$ but the same degree of exactness of balance is not required as between $R_2$ and $R_4$. It is also necessary that the source of A. C. current shall have as nearly as possible a pure sine wave form.

In this invention I do not confine the means of detecting the balance of the currents in $R_2$ and $R_4$ to the method shown in the diagram, but any means may be used which does not allow the impedance terminating circuit B to be altered by the apparatus used to detect the difference in the currents in $R_2$ and $R_4$ and similarly does not allow the impedance terminating circuit A to be altered in any way.

The variable capacity, the variable inductance and the variable resistance are made with indicating scales from which the transmission losses may be computed as explained above.

What I claim is:—

1. In an electrical measuring apparatus, an electrical circuit having two branches, each terminating in an impedance and having therebetween a break and means for determining the condition of one branch in respect to the other, one of said branches having a gap wherein the line or apparatus is inserted for test and electrical means in the other branch for making the current in the two branches equal in magnitude and in phase.

2. In an electrical measuring apparatus, an electrical circuit having two branches, one of said branches having a gap for the introduction of the line or apparatus to be tested, means for detecting the difference in the magnitude and phase of the currents in the two branches, and means introduced in the other branch for varying the magnitude and phase of the current in it, and from the indications supplied by this means to determine the losses produced by the insertion of the line or apparatus in the gap as aforesaid.

3. In a transmission measuring apparatus for determining transmission losses in electrical circuits, comprising a circuit having two branches, impedances to terminate each end of each of the branches in such a way as to render these terminating impedances each equal to the characteristic impedance of the circuit in which the apparatus is normally used and to simulate thereby the normal condition of use and allow the measurement of the transmission loss to be made in such a manner as to give a value equivalent to the value it would have under the conditions in which the apparatus is used.

4. In a transmission measuring apparatus for determining transmission losses in electrical circuits, comprising a circuit having two branches, impedances to terminate each end of each of the branches, means to vary these impedances so that they will simulate the impedances of the circuit in which the apparatus is normally used, and to facilitate the measurement of transmission losses in the apparatus under different conditions of use.

5. In a transmississon measuring apparatus for determining transmission losses in electrical circuits, comprising a circuit having two branches, one of which contains a series impedance, means for varying the impedance in order to change the magnitude and phase of the current in the first branch, so that the effect of placing this impedance in series with this branch is to change the current in this branch in exactly the same manner as the change in the current in the second branch produced by inserting the apparatus in series with this second branch, and means for detecting a difference in magnitude or in phase between the current in the first branch and the current in this second branch.

Signed at the city of Montreal, Quebec, Canada, this 4th day of February, 1920.

J. L. CLARKE.